(12) United States Patent
Sadeghian Marnani et al.

(10) Patent No.: US 10,488,433 B2
(45) Date of Patent: Nov. 26, 2019

(54) POSITIONING ARM FOR AND METHOD OF PLACING A SCAN HEAD ON A SUPPORT SURFACE

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Jasper Winters, 's-Gravenhage (NL); William Edward Crowcombe, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 15/743,762

(22) PCT Filed: Jul. 14, 2016

(86) PCT No.: PCT/NL2016/050519
§ 371 (c)(1),
(2) Date: Jan. 11, 2018

(87) PCT Pub. No.: WO2017/010881
PCT Pub. Date: Jan. 19, 2017

(65) Prior Publication Data
US 2018/0203036 A1    Jul. 19, 2018

(30) Foreign Application Priority Data

Jul. 15, 2015   (EP) .................................... 15176889

(51) Int. Cl.
*G01Q 10/04*   (2010.01)
*B23Q 1/34*    (2006.01)

(52) U.S. Cl.
CPC ............... *G01Q 10/04* (2013.01); *B23Q 1/34* (2013.01); *B23Q 2717/00* (2013.01)

(58) Field of Classification Search
CPC ....... G01Q 10/04; B23Q 1/34; B23Q 2717/00
See application file for complete search history.

(56) References Cited

U.S. PATENT DOCUMENTS

| 4,575,942 A | 3/1986 | Moriyama |
| 5,656,769 A * | 8/1997 | Nakano .................. G01Q 10/04 310/328 |

(Continued)

FOREIGN PATENT DOCUMENTS

| DE | 19826984 A1 | 1/1999 |
| EP | 2680012 A1 | 1/2014 |

OTHER PUBLICATIONS

Rastakhiz et al., "Multiple Interconnected Parallelogram Actuators and Parallelogram Rigid Frames", pp. 1-4.

(Continued)

*Primary Examiner* — Eliza W Osenbaugh-Stewart
(74) *Attorney, Agent, or Firm* — Hoffmann & Baron, LLP (57) ABSTRACT

The invention is directed at a positioning arm for positioning of a scan head of a surface scanning measurement device—such as a scanning probe microscopy device—relative to a surface. The positioning arm comprises a base at a first end thereof for mounting the arm with the base to a static reference structure. The positioning arm further comprises a first and a second arm member extending from the base, the second arm member extending parallel to the first arm member. The arm comprises a bridge member at a second end thereof, connecting the first and the second arm members. The first and the second arm member are respectively connected to each one of said base and said bridge member by means of a hingeable connection. The positioning arm further comprises an actuator for inducing a relative dis- (Continued)

placement between the first and the second arm member in a longitudinal direction of said first and second arm member for swinging the second end of the positioning arm in a direction transverse to the lateral displacement. The bridge member comprises a support for supporting the scan head.

15 Claims, 7 Drawing Sheets

(56) References Cited

U.S. PATENT DOCUMENTS

| | | | | |
|---|---|---|---|---|
| 6,076,397 A * | 6/2000 | Binnig | .................... | B23Q 3/18 73/105 |
| 6,624,548 B1 * | 9/2003 | Miller | .................... | H02N 1/008 310/307 |
| 7,529,016 B1 * | 5/2009 | Allen | ................. | G02B 26/0841 359/290 |

OTHER PUBLICATIONS

Korpelainen et al., "Calibration of a Commercial AFM: Traceability for a Coordinate System", Measurement Science and Technology, vol. 18, pp. 395-403; 2007.
Sinno et al., "Enlarged Atomic Force Microscopy Scanning Scope: Novel Sample-Holder Device with Millimeter Range", Review of Scientific Instruments, vol. 78, 095107; 2007.
Ando et al., "A High-Speed Atomic Force Microscope for Studying Biological Macromolecules", PNAS, vol. 98, No. 22, pp. 12468-12472; 2001.

* cited by examiner

POSITIONING ARM FOR AND METHOD OF PLACING A SCAN HEAD ON A SUPPORT SURFACE

FIELD OF THE INVENTION

The present invention is directed at a positioning arm for positioning of a scan head of a surface scanning measurement device relative to a surface, wherein the positioning arm comprises a base at a first end thereof for mounting the arm with the base to a static reference structure. The invention is further directed at a method of positioning of a scan head of a scanning probe microscopy device relative to a surface.

BACKGROUND

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, AFM may be used for critical defect metrology (CD-metrology), particle scanning, stress- and roughness measurements. AFM microscopy allows visualization of surfaces at very high accuracy, enabling visualization of surface elements at sub-nanometer resolution. Other surface scanning measurement devices for example include optical near field scanning devices.

Many SPM devices apply positioning arms for accurate positioning of a scan head relative to a surface, such as a reference surface or reference frame. As will be appreciated, the accuracy of measurement of the SPM is directly influenced by the accuracy with which the scan head may be positioned. Positioning arms for example extend to the scan head over a certain distance over (or under) the surface, and then swing the scan head to the desired position.

Accurate positioning may be certified by sensors, feedback and control units of the SPM systems. Although an acceptable level of accuracy for many applications may be achieved in this manner, additional accuracy is many times welcome on the typical scale of dimensions on which scanning probe microscopy is often performed.

SUMMARY OF THE INVENTION

It is an object of the present invention to improve the accuracy of positioning of a scan head in a scanning probe microscopy system.

To this end, there is provided herewith a positioning arm for positioning of a scan head of a surface scanning measurement device relative to a surface, wherein the positioning arm comprises a base at a first end thereof for mounting the arm with the base to a static reference structure, wherein the positioning arm further comprises a first and a second arm member extending from the base, the second arm member extending parallel to the first arm member, wherein the positioning arm comprises a bridge member at a second end thereof, the bridge member connecting the first and the second arm members at said second end of the positioning arm, wherein each one of the first and the second arm member is respectively connected to each one of said base and said bridge member by means of a hingeable connection, and wherein the positioning arm further comprises an actuator for inducing a relative displacement between the first and the second arm member in a longitudinal direction of said first and second arm member for swinging the second end of the positioning arm in a direction transverse to the lateral displacement, wherein the bridge member comprises a support for supporting the scan head.

Throughout the present disclosure, the term surface scanning measurement device is to be interpreted as including scanning probe microscopy devices in particular. In addition, the present invention may also be applied to optical near field scanning devices, which are also surface scanning measurement devices as meant in the present disclosure. Optical near field scanning devices may amongst others be applied for performing microscopy. Although the present document in many occasions will refer to scanning probe microscopy devices, systems and methods, it is to be understood that the teachings of the present documents may likewise be applied to optical near field scanning devices. Therefore, in many cases where the text specifically mentions a 'scanning probe microscopy device' (or system), this term can often be interchanged with the term 'optical near field scanning device' (or system) without departing from the invention.

The term 'hingeable connection' hereinabove refers to a connection which is at least hingeable around an axis of rotation transverse to the surface. Preferably, if no rotation in any other direction is desired, at least one of the hingeable connections is only hingeable around the axis of rotation transverse to the surface. Even more preferable, to make the positioning arm sufficiently static in any rotational direction other than the rotation around the axis transverse to the surface, all the hingeable connections between the base, the first arm member, the bridge, and the second arm member are limited in rotation only around the axis of rotation transverse to the surface.

In the present invention, the actuator allows for inducing a relative displacement between the first arm member and the second arm member. This relative displacement is directed in the longitudinal direction of the first and the second arm members, hence moving the first arm member and the second arm member parallel to each other. Considering for example the base having a hingeable connection with the first arm member and a further hingeable connection with the second arm member. By displacing the first arm member relative to the second arm member in the longitudinal direction thereof will change the angled orientation of the base relative to the first and second arm member. By fixing the base to a static reference structure, by inducing a relative displacement between a first arm member and the second arm member in the longitudinal direction, since the base is fixed to the static reference structure the first and second arm member will swing in the same direction due to the changing angled orientation of the base relative to the both arm members. Furthermore, the bridge member which has a hingeable connection with the first arm member and a further hingeable connection with the second arm member, will always remain in the same angled orientation relative to the first and second arm member as the angled orientation of the base. This principle can be easily understood by drawing a rectangle wherein the long sides of the rectangle schematically represent the first arm member and a second arm member, and the short sides of the rectangle respectively represent the base and the bridge member (e.g. see FIGS. 2A and 2B explained further below). By displacing one of the long sides of the rectangle relative to the other long side in the longitudinal direction, the rectangle changes into a parallelogram, considering the hingeable connections are located at the four corners of the rectangle. By fixing one of the short sides (the base) to e.g. a wall, the same displacement between the long sides of the rectangle will cause the arm members to swing in a same direction. However, the bridge member, i.e. the other short side of the rectangle/parallelogram, will always maintain the same angled orientation relative to the first and second arm member as the base. In other words, the bridge member will always be parallel to the base (provided that these were parallel from the start).

Thus, by having the actuator of the positioning arm induce a relative displacement between the first arm member and the second arm member in the longitudinal direction thereof, the positioning arm of the present invention will swing around an axis of rotation perpendicular to the surface, while the bridge member always maintains the same orientation. This principle is used in the positioning arm of the present invention for allowing highly accurate positioning of the scan head of a scanning probe microscopy device relative to the surface. If the scan head is supported by or attached to the bridge member, swinging of the positioning arm in this manner can be accurately controlled and does not change the orientation of the scan head during swinging. For example, if the scan head is positioned relative to a reference surface, e.g. a surface providing a very accurate reference grid for performing atomic force microscopy, the swinging of the positioning arm allows to move the scan head in the direction perpendicular to the arm without changing the orientation of the scan head relative to the references on the reference frame. By maintaining the orientation of the scan head fixed during positioning, a source of error resulting from variation in orientation between the scan head and the reference frame during swinging, as in a conventional positioning arm, is excluded. Therefore, positioning of the scan head may be performed and checked with greater accuracy using a positioning arm of the present invention.

In accordance with an embodiment of the present invention, a positioning arm further comprises a controller cooperating with the actuator for controlling operation thereof for controlling the relatively displacement between the first and the second arm. This controller may be located on the positioning arm itself, or it may be an external controller or control means that is communicatively connected to the arm (either by a wireless or wireline connection) for controlling the actuator accurate.

In accordance with an embodiment thereof, the controller may be arranged for obtaining an amount of the relative displacement between the first and second arm member, wherein the controller is arranged for calculating a transverse displacement of the bridge in a direction transverse to the positioning arm based on the amount of relative displacement, i.e. the relative displacement between the first and second arm member. As may be appreciated, in the positioning arm of the present invention, the change in angled orientation of the base relative to the first and second arm member (and likewise that of the bridge member) is directly dependent on the relative displacement between the first and the second arm member. By storing or otherwise making available data regarding the relation between the relative displacement between the first and the second arm member and the angled orientation of the base or bridge member to the controller, the controller is able to accurately control the transverse displacement of the bridge in the transverse direction of the positioning arm by directly controlling (and knowing) the relative displacement between the first and second arm member. Various possibilities are available to the skilled person for making available or known the amount of relative displacement between the first and the second arm member. For example, this information may already be available to the controller by counting the rotation steps taken by a stepper motor that may be part of the actuator. Keeping track of the number of steps in either direction, the relative displacement between the first arm member and the second arm member is in principle know to the controller. As may be appreciated this may in some cases not be sufficiently accurate because of the risk of not counting a step or losing track of count.

Therefore, in accordance with a further embodiment of the present invention the positioning arm further comprises a sensor unit for measuring the relative displacement between the first and second arm member and for providing a sensor signal indicative of said relative displacement to the controller. By simply sensing the relative displacement by a sensor, the relative displacement is directly measured and can be made available to the controller. Alternatively, the controller may keep track of the relative displacement itself (e.g. by counting the steps of a stepper motor) while at the same time this information is presented via the sensor unit that directly measures the relative displacement.

In accordance with some embodiments of the present invention the actuator of the positioning arm is arranged between the first arm member and the second arm member, and wherein the actuator comprises a first actuator part fixedly mounted to either one of the first or second arm member, and wherein the actuator comprises at least one second actuator part that is movable relative to the first actuator part by means of operation of the actuator in use, wherein the second actuator part acts upon said second arm member for inducing said relative displacement between the first and second arm member. The positioning arm in accordance with these embodiments comprises a compact design wherein the actuator is fixed to the first arm member while acting upon the second arm member. The actuator may for example comprise at least one or more of: a large stroke actuator element for enabling large stroke longitudinal displacements between the first and second arm member, such as a spindle type actuator, or a small stroke actuator element for enabling small stroke longitudinal displacements between the first and second arm member, such as a piezo type actuator. In particular, by including both a large stroke actuator element and a small stroke actuator element, the swinging of the positioning arm in the direction transverse to the arm can be controlled accurately. The exact positioning of the scan head may be monitored using a feedback system that monitors references on a reference surface as they pass by.

In accordance with yet a further embodiment, the large stroke actuator element comprises a spindle, wherein the spindle is comprised by the second actuator part and cooperates with the first actuator part to be movable relative thereto, and wherein the second actuator part further comprises a piezo type actuator mounted on a tip of said spindle and forming the small stroke actuator. In this embodiment, the spindle and the piezo type actuator are superpositioned (i.e. extend each other) thereby cooperating in such a manner that the large strokes may be achieved by operating the spindle (using e.g. a stepper motor) while the small strokes may be achieved by operating the piezo type actuator. The relative displacement may accurately be determined using a sensor unit, e.g. such as described hereinabove. As will be appreciated, in some embodiments a first end of the actuator may be fixed to the first arm member, while a second end may be fixed to the second arm member, and operation of the actuator displaces the second arm member relative to the first arm member. However, alternatively the end of e.g. a second actuator part may merely abut a structural element on the second arm member (i.e. in absence of a fixation), while a return spring between the first and second arm member ensures that the structural element on the second arm member remains in abutment with the end of the second actuator part.

The hingeable connections between the base and the first arm member, the first arm member and the bridge, the bridge and the second arm member, and the second arm member and the base may be of any suitable type known to the skilled person. An advantageous type of hingeable connection that may be applied with a positioning arm of the present invention may be a Haberland type hinge. The Haberland hinge is a flexible joint that connects two members for relative angular displacement. This type of hinge therefore does not require any bearings. Moreover, the Haberland hinge comprises a high degree of reproducibility in terms of deflection versus force required. The absence of bearings eliminates contamination resulting therefrom during operation of the hinge.

In accordance with some embodiments, the positioning arm further comprises a cover enclosing at least a part of the actuator. The cover, enclosing a part or all of the actuator on the arm, catches any contamination produced inadvertently by the actuator in use. As may be appreciated contamination from any part of the positioning arm may be destructive to the accuracy of the measurement system. In accordance with some of these embodiments the cover may comprise at least one element of a group comprising: a bellows, a flexible cover element, a sleeve, a cloth, or container element.

A sensor unit for measuring a relative displacement between the first and the second arm member may comprise any of the group comprising: an optical distance sensor, such as an interferometer, an electrical proximity sensor, such as a capacitive sensor or inductive sensor.

In accordance with a further aspect of the present invention, there is provided a surface scanning measurement device, such as a scanning probe microscopy device or an optical near field scanning device, comprising a positioning arm in accordance with any of the embodiments described hereinabove for positioning a scan head of the scanning probe microscopy device relative to a surface.

In accordance with a third aspect of the present invention there is provided a method of positioning a scan head of a surface scanning measurement device relative to a support surface, wherein for performing said placing of the scan head use is made of a positioning arm comprising a base at a first end thereof wherein the base is mounted to a static reference structure, wherein the positioning arm further comprises a first and a second arm member extending from the base, the second arm member extending parallel to the first arm member, wherein the positioning arm comprises a bridge member at a second end thereof, the bridge member connecting the first and the second arm members at said second end of the positioning arm, wherein each one of the first and the second arm member is respectively connected to each one of said base and said bridge member by means of a hingeable connection, and wherein the method further comprises a step of: supporting the scan head from a support structure connected to the bridge of the positioning arm; and moving the support structure by inducing, by means of an actuator comprised by the positioning arm, a relative displacement between the first and the second arm member in a longitudinal direction of said first and second arm member, for swinging the second end of the positioning arm in a direction transverse to the relative displacement.

The method, in accordance with some embodiments may further comprise the steps of controlling, by a controller cooperating with the actuator, operation of the actuator for controlling the relative displacement between the first and the second arm member: wherein the step of controlling includes: obtaining, by the controller, an amount of said relative displacement between the first and second arm member, and calculating by the controller a transverse displacement of the bridge in a direction transverse to the positioning arm based on the amount of relative displacement.

In accordance with yet further embodiments, the method may comprise measuring, using a sensor unit, the relative displacement between the first and the second arm member; and providing a sensor signal, by the sensor unit to the controller, indicative of said relative displacement.

In some embodiments, the method comprises providing a return force between the first and second arm member directed towards an offset position of the second arm member relative to the first arm member, wherein said return force is provided by means of a spring member mounted between the first and the second arm member.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
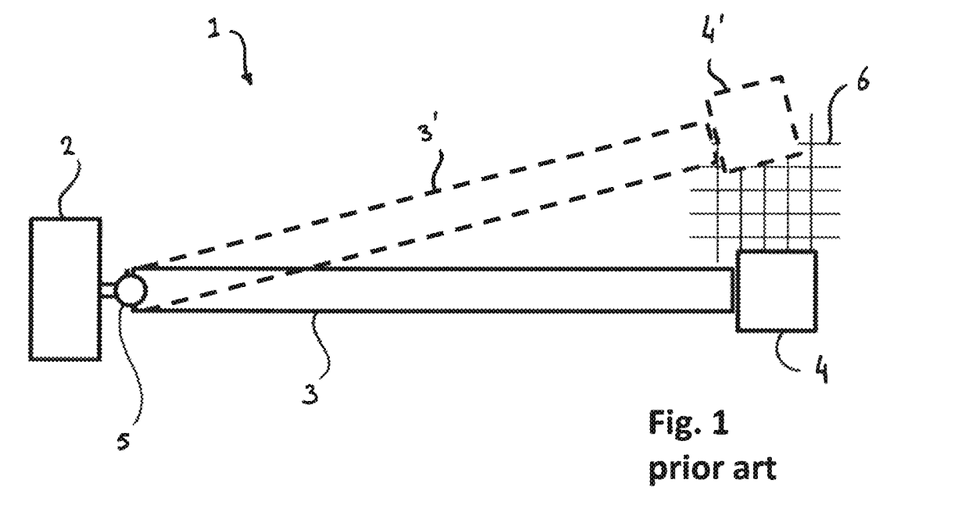
FIG. 1 schematically illustrates a conventional positioning arm for positioning a scan head of a scanning probe microscope.

A conventional positioning arm 1 of a scanning probe microscopy device is schematically illustrated in FIG. 1. Only the relevant parts of the positioning arm 1 are illustrated in FIG. 1. The arm 1 usually allows movement of the scan head 4 at the end of the arm in the X and Y direction, wherein the X direction may be defined as the longitudinal direction of the arm 3, and the Y direction is the direction transverse to the longitudinal direction of the arm across the surface (i.e. the lateral direction). FIG. 1 also illustrates schematically a reference grid 6 that may be used in an optical feedback system to keep track of the exact location of the scan head 4 relative to the surface that contains the reference grid 6.

The conventional arm 1 may comprise an arm member 3 at the end of which the scan head 4 may be resided. The scan head 4 may be supported by a support structure or carrier of any kind. The arm member 3 may be connected with its other end via a hinge 5 to a fixed base 2. The base 2 may be fixed to a static reference structure of the scanning probe microscopy device, such as a force frame or metrology frame (not shown). The hinge 5 allows rotation of the arm member 3 around an axis of rotation transverse to the surface upon which the reference grid 6 resides. To move the scan head 4 in the Y direction, the lateral direction relative to the arm member 3, the arm member 3 is rotated with the hinge 5 around the axis of rotation. For example the arm member 3 may be brought in the position 3' illustrated with the dotted lines in FIG. 1. In this position, the scan head 4 resides in the position 4' illustrated in FIG. 1. As follows from FIG. 1, not only is scan head 4 displaced in the lateral direction relative to the offset location, also the orientation angle is different in the position 4' relative to position 4 of the scan head. Because of the different orientation angle relative to the static reference grid 6, an inaccuracy is introduced in the determinable position of the scan head 4 in the position 4'. As will be appreciated, because scanning probe microscopy systems allow to perform microscopy with a high degree of accuracy, the inaccuracy caused by displacement of the scan head 4 in the Y direction is not desired.

Figure 2A:
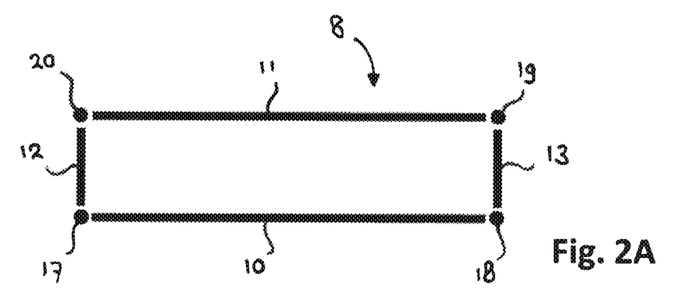
FIGS. 2A-2D schematically illustrates a positioning arm in accordance with the present invention.

The principle of a positioning arm in accordance with the present invention is schematically illustrated in FIGS. 2A-2D. FIG. 2A schematically illustrates a positioning arm 8 in accordance with the present invention. This highly schematic illustration shows a rectangle comprising a first arm member 10 and a second arm member 11 forming the long sides of the rectangle. The arm 8 further comprises a base 12 and a bridge member 13 at the ultimate ends thereof. The base 12, the first arm member 10, the bridge 13, and the second arm member 11 are interconnected by hingeable connections formed by hinges 17, 18, 19 and 20. The axes of rotation of the hinges 17-20 is perpendicular to the paper of the illustration of FIG. 2A. Dependent on the application of positioning arm 8, the skilled person may appreciate that the hinges 17, 18, 19 and 20 may optionally comprise additional degrees of freedom or additional rotation axis dependent on their application. For the present invention at least the axis of rotation perpendicular to the paper in FIG. 2A is to be allowed by the hinges 17-20. In many applications, although positioning arm 8 is required to allow rotation in one direction, rotation in other direction is often not desired. In that case, positioning arm 8 and the hinges 17, 18, 19 and 20 of FIG. 2A may allow rotation only around the axis of rotation perpendicular to the paper.

Figure 2B:
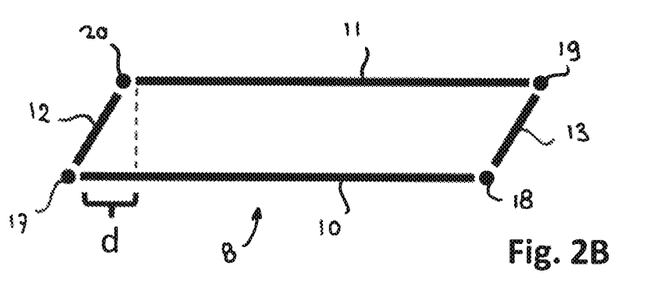

FIG. 2A illustrates the starting position wherein each of the angles between the base 12 and the first arm member 10, the first arm member 10 and the bridge member 13, the bridge member 13 and the second arm member 11, and the second arm member 11 and the base 12 are straight angles. If second arm member 11 is displaced relative to first arm member 10 in the longitudinal direction, as is illustrated in FIG. 2B, the rectangle transforms into a parallelogram as illustrated. In this situation, the angles between the base 12 and the first arm member 10 and between the bridge member 13 and the second arm member 11 will be smaller than 90 degrees, and the angles between the first arm member 10 and the bridge member 13, and the second arm member 11 and the base 12 will be larger than 90 degrees. In the illustration of FIG. 2B, second arm member 11 is relatively displaced over a distance d in the longitudinal direction relative to first arm member 10.

Figure 2C:
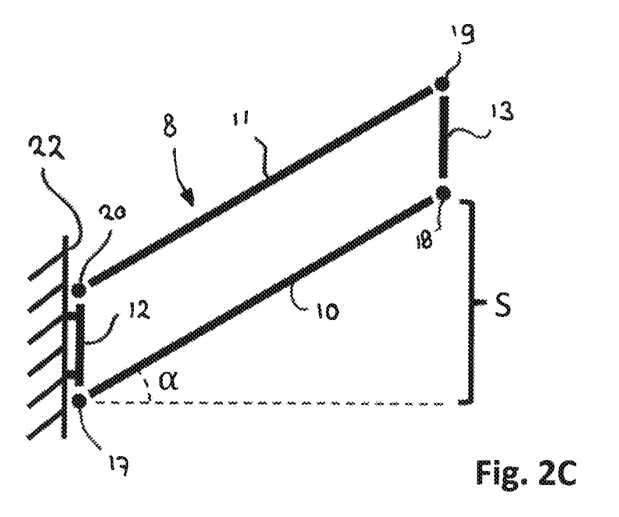

FIG. 2C shows the situation wherein the base 12 has been fixed to a static reference structure 22. The static reference structure 22 in the form of a wall keeps the base 12 in place, regardless of the angles between the first and second arm members 10 and 11 and the base 12 and the bridge member 13. In case the same relative displacement d is applied between the first arm member 10 and the second arm member 11, due to fixing of the base 12 to the static reference structure 22, the positioning arm 8 is rotated around an angle α illustrated in FIG. 2C. The rotation around angle α causes the bridge member 13 to be displaced over a distance or stroke S. The magnitude of stroke or deflection S may be determined using the Pythagorean theorem. As follows from FIG. 2C, whatever the rotation angle α will be, base 12 and bridge member 13 will always be parallel to each other. Therefore, in case a scan head would be attached or supported by the bridge member 13, the positioning arm 8 of the present invention allows displacement of the scan head in the Y direction (i.e. the lateral direction relative to the positioning arm 8), while maintaining the orientation angle the same under all circumstances. This eliminates the inaccuracy caused by a changing angled orientation resulting from the use of a conventional positioning arm. What is required to allow rotation of the arm 8, is a mechanism that can induce a relative displacement in the longitudinal direction between the first arm member 10 and the second arm member 11.

Figure 2D:
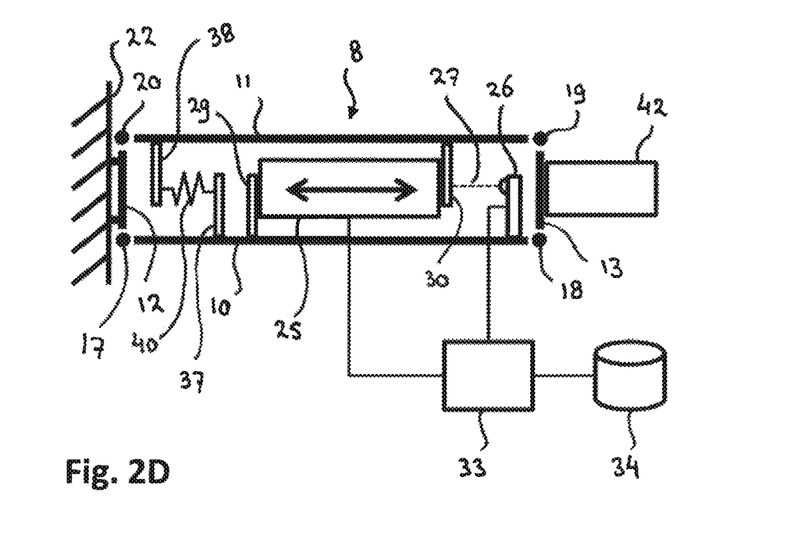

A schematic illustration of the positioning arm 8 of the present invention including a possible mechanism for applying and controlling such a relative displacement is schematically illustrated in FIG. 2D. In this figure, an actuator element 25 acts upon structural members 29 and 30 that are respectively connected to the first arm member 10 and the second arm member 11. In a preferred embodiment, the actuator 25 may be fixed to e.g. the first arm member 10, while the ultimate end thereof abuts to structural element 30 of the second arm member 11. A return spring 40 between two further structural elements 38 and 37 respectively connected to the second arm member 11 and the first arm member 10, may ensure that the structural element 30 remains in abutment with the ultimate end of actuator 25. By expanding or retracting the actuator 25 as illustrated by the double arrow by FIG. 2D, the relative displacement between the first arm member 10 and the second arm member 11 can be controlled. This allows rotation of the arm 8 of the present invention.

As may be appreciated, it is preferred to control and monitor the relative displacement between the first and the second arm members 10 and 11, such as to allow controlling of the displacement in the Y direction of the scan head 42. Therefore, the positioning arm 8 may comprise a controller 33 that is communitively connected to the actuator 25 for controlling operation thereof. The positioning arm 8 may further comprise a sensor unit 26 which allows to determine the exact relative displacement between the first arm member 10 and the second arm member 11. The sensor unit 26 may be an optical sensor unit that sends a laser beam 27 to a specular reflective surface residing on element 30. A return beam may be caught by an interferometer that accurately measures the relative displacement between the first arm member 10 and the second arm member 11. Alternatively, a sensor unit 26 may be of a different type, such as an electrical type sensor unit (e.g. a capacitive sensor or an inductive sensor). The sensor unit 26 provides a sensor signal to the controller 33 which uses the determined relative displacement between the first arm member 10 and the second arm member 11 as input to calculate the rotation angle of arm 8. For example, memory 34 may provide data regarding the relation between the relative displacement detected and the rotation angle of the arm 8.

Figure 3:
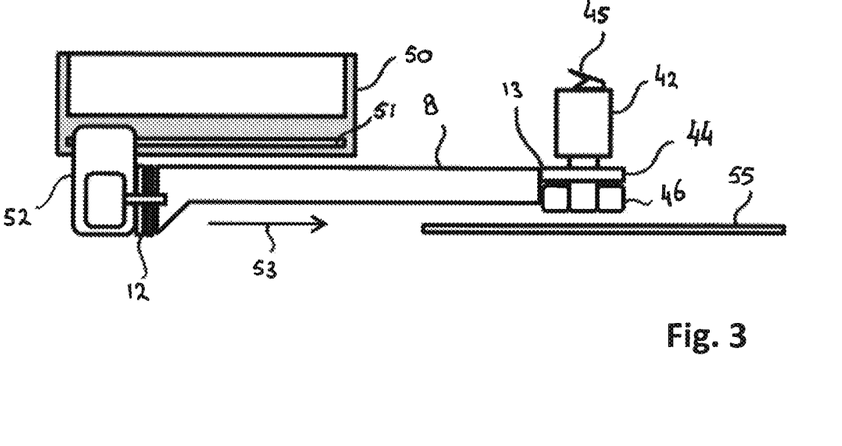
FIG. 3 provides a side view of a positioning arm in a scanning probe microscopy device in accordance with the present invention.

A side view of the positioning arm 8 is schematically illustrated in FIG. 3. The positioning arm 8 may be mounted with its base 12 to a further actuator 52 which allows extension of the arm 8 in the X direction (the direction indicated by arrow 53) by cooperating with a rail 51 on the static reference structure 50. Extending from the bridge member 13, a carrier 44 supports the scan head 42. If the scan head 42 is positioned correctly relative to the reference surface 55 (this may be detected by monitoring a reference grid on the surface 55), the scan head 42 may be carefully positioned with its feet 46 on the reference surface 55. The scan head 42 is then mechanically free from the positioning arm 8. Next, a wafer to be scanned may be lowered from above (not shown) until the probe 45 enables sensing of the wafer surface by performing scanning microscopy.

Figures 4A, 4B:
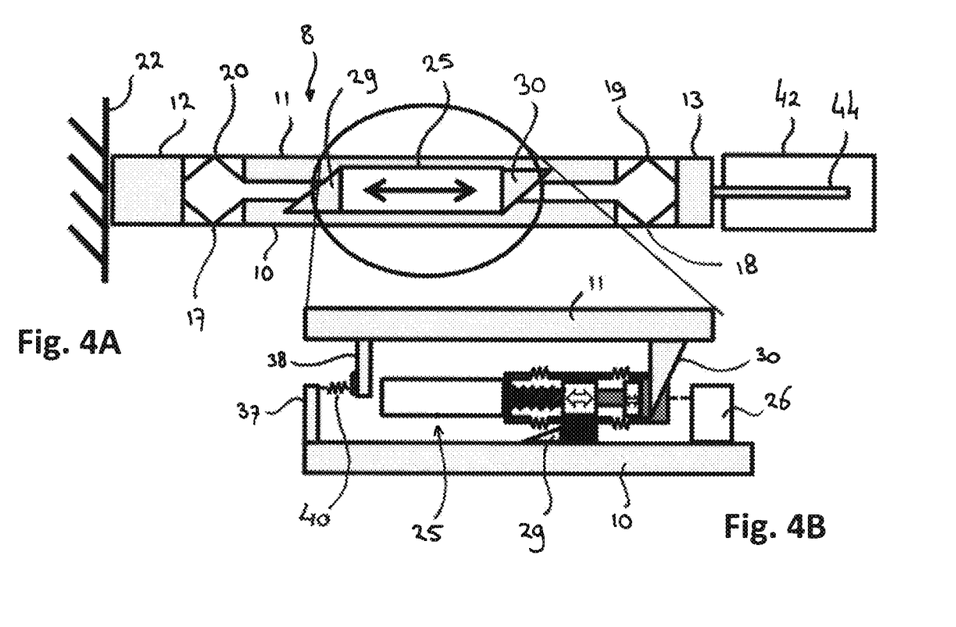
FIGS. 4A and 4B respectively provide a top view of a positioning arm of the present invention and an enlargement of the actuator thereof.

FIG. 4A illustrates a schematic top view of the positioning arm 8 of the present invention. FIG. 4A shows the first arm member 10 and the second arm member 11, and the base 12 and bridge member 13. The base 12 is mounted to a static reference structure 22. The hinges 17, 18, 19 and 20 are flexible hinges that are also known as Haberland hinges. Haberland hinges provide a high degree of reproducibility of the deflection angle relative to the applied force. Such force may be applied by means of the actuator 25 that induces a displacement between the structural elements 29 and 30 of the first arm member 10 and the second arm member 11 respectively. An enlargement of the encircled portion in FIG. 4A is provided in FIG. 4B, showing the actuator 25 in more detail. FIG. 4B is further enlarged in FIG. 5.

Figure 5:
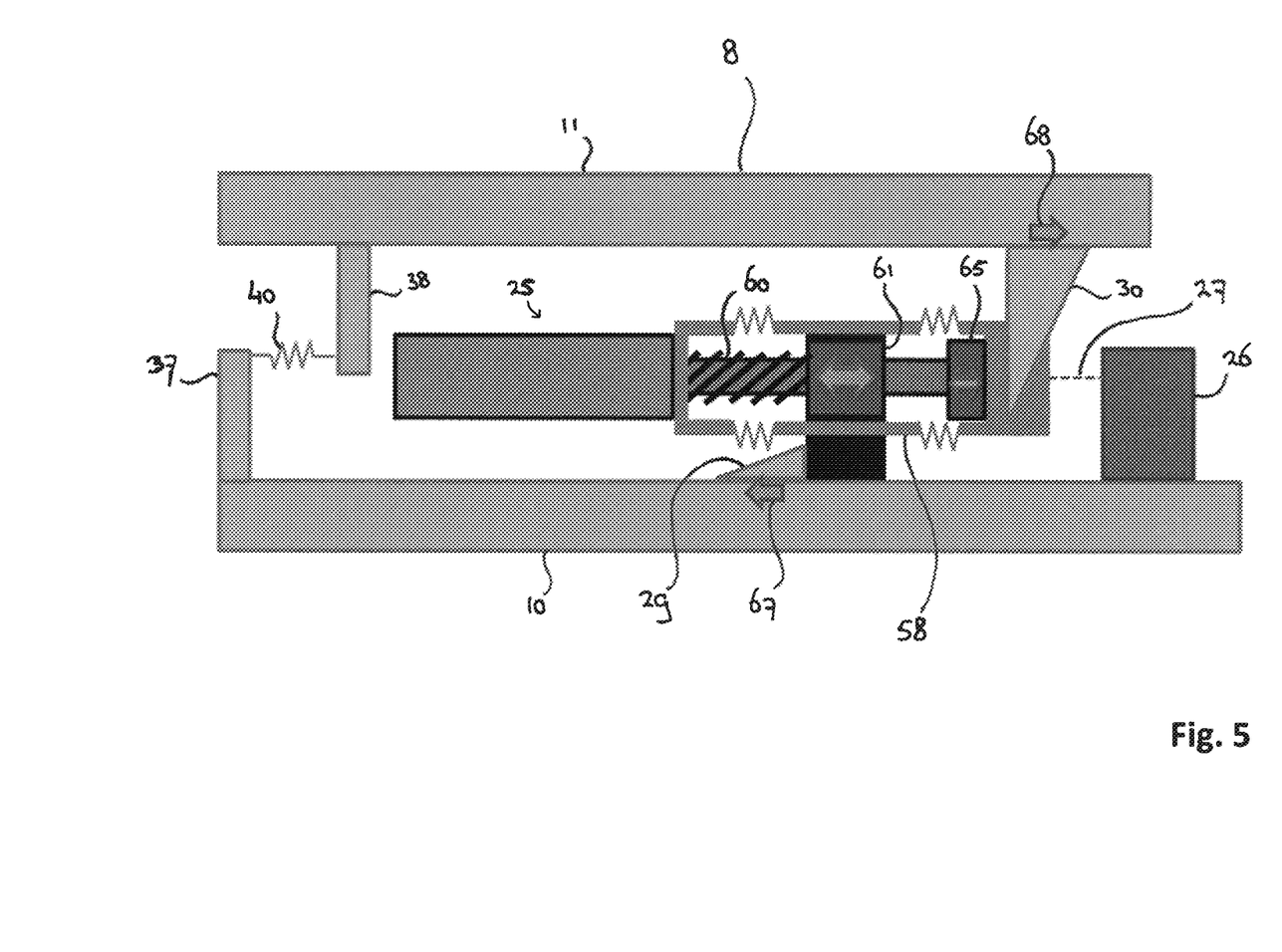
FIG. 5 is an enlargement of the schematic illustration of FIG. 4B of the actuator.

As illustrated in FIG. 5, the actuator 25 comprises several actuator parts for inducing a large stroke and a small stroke. A large stroke actuator part is provided by the spindle 60 rotating in element 61 to induce a large stroke relative displacement between the first arm member 10 and the second arm member 11. At the end of the spindle 60, a piezo type actuator 65 allows to induce a small stroke displacement between the first arm member 10 and the second arm member 11. As will be appreciated, different types of actuators may be applied for using small stroke or large stroke displacements between first arm member 10 and second arm member 11. Operation of the spindle 60 by extending it in the direction of structural element 30, induces the forces 67 and 68 in the first arm member 10 and second arm member 11 respectively. This results in the relative displacements between the first and second arm members 10 and 11, and therefore by a rotation of the positioning arm 8 of the present invention. FIG. 5 further illustrates the optical sensor unit 26 providing the laser beam 27 to a specular reflective surface such as to allow accurate determination of the relative displacement.

The spindle 60 and the piezo actuator 65, including element 61, are located inside a cover 58 (here a bellows) to prevent any contamination resulting from operation of the actuator 25 to fall upon the surface below the positioning arm. As may be appreciated, under the circumstances wherein the scanning probe microscopy device is operated, even the slightest contamination may cause an incorrect measurement of the surface. This is prevented by covering any of the moving parts by means of the cover 58. FIG. 5 further shows the return spring 40 which biases the second arm member 11 relative to the first arm member 10 such as to ensure that structural element 30 always abuts the end of the actuator 25.

Figure 6:
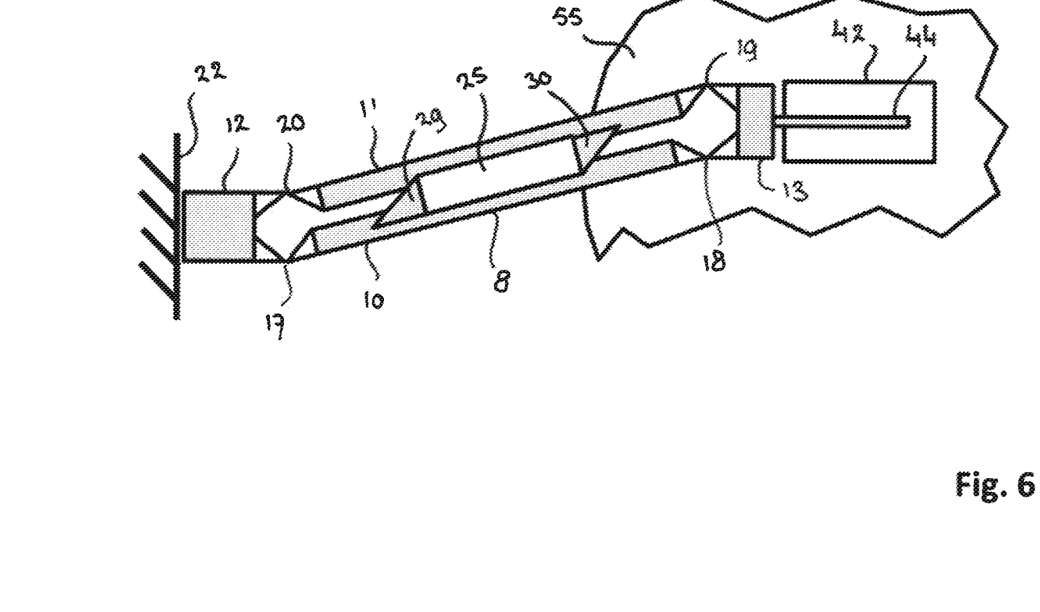
FIG. 6 schematically illustrates operation of a positioning arm in accordance with the present invention.

FIG. 6 schematically illustrates an operation of positioning arm 8 of the present invention. In FIG. 6, the relative displacement between the first arm member 10 and the second arm member 11 induced by actuator 25 acting on structural elements 29 and 30 causes a rotation in the positioning arm 8 for displacing the scan head 42 in the lateral direction. As follows from FIG. 6, bridge member 13 remains parallel to base 12 regardless of the rotation angle of the arm 8. This allows placement of the scan head 42 and accurate verification of its position on the reference grid located on the surface 55 upon which the scan head 42 is placed. FIG. 6 also illustrates the operation of the Haberland hinges 17, 18, 19 and 20.

Figure 7:
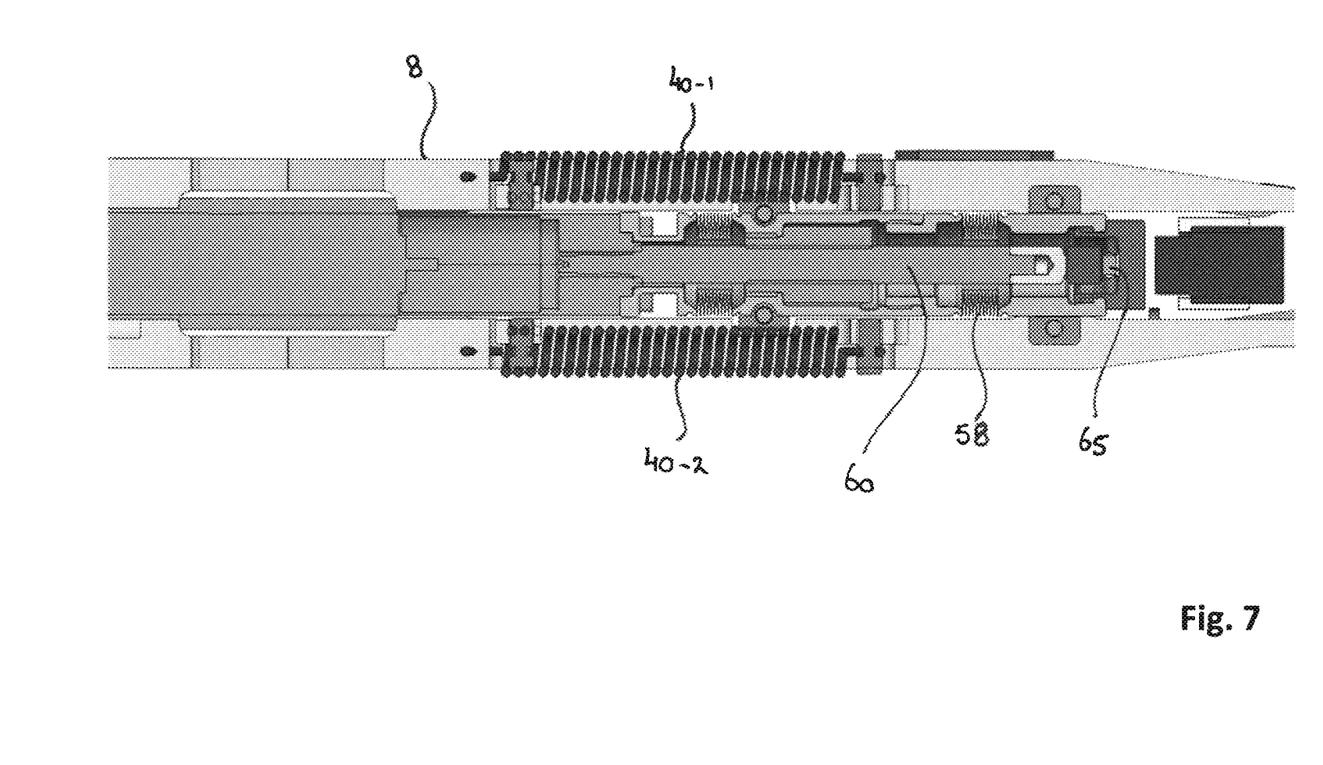
FIG. 7 provides a CAD illustration of the actuator of a positioning arm in accordance with the present invention.

FIG. 7 provides an enlarged CAD image of the actuator applied in a positioning arm of the present invention. The arm 8 comprises two return springs 40-1 and 40-2. The actuator comprises a spindle 60 and a piezo type actuator 65 enclosed by a cover 58 in the form of a bellows. Element 26' is a sensor unit of electrical type. In the present case, the sensor unit 26' is an inductor type sensor unit which allows to accurately determine the relative displacement between the first and the second arm members 10 and 11 respectively.

Figure 8:
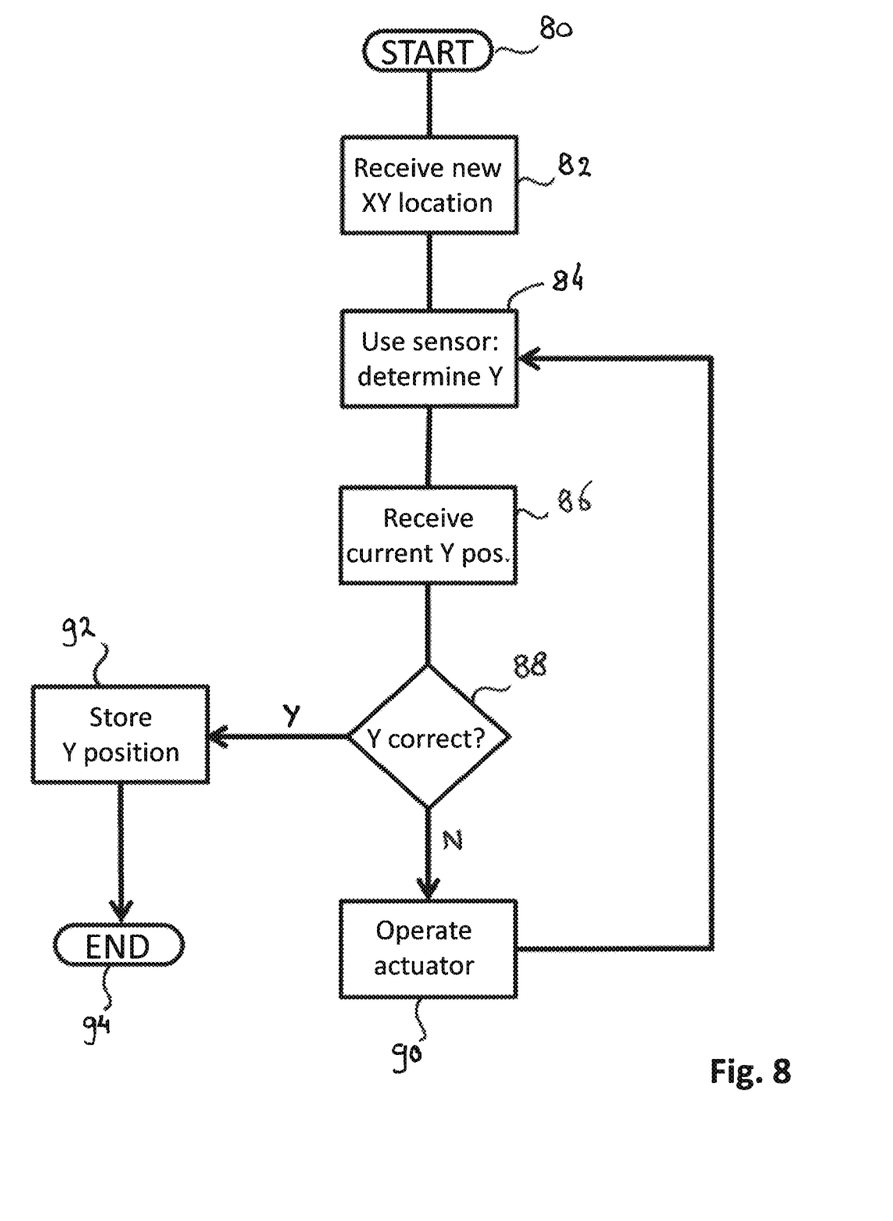
FIG. 8 schematically illustrates a method of the present invention.

FIG. 8 schematically illustrates the method of the present invention for controlling the positioning of the scan head relative to a surface in the scanning probe microscopy device. Starting at 80, the controller may receive a new desired XY location relative to the surface in step 82. Upon receiving the new location, the controller 33 in step 84 may operate the sensor unit 26 to determine the current Y position of the scan head. As will be appreciated, either before, during or after step 84, or even maybe towards the end of the method of FIG. 8, controller 33 may also adjust the X position. Referring to FIG. 3, adjusting of the X position may conventionally be achieved by extending the positioning arm 8 or retracting it, dependent on the required displacement. The adjustment of the current X position of the scan head 42 is not considered relevant with respect to the present invention and is therefore not shown in the method of FIG. 8.

For adjusting the Y position, in step 84 the sensor unit 26 is operated by the controller 33 to determine the current Y position. In step 86, the controller 83 receives the current Y position from the sensor unit 26. Next in step 88, the controller determines whether the current Y position is the correct Y position by comparing it to the received new XY location. In case the current Y position of the scan head 82 relative to the surface is incorrect, the method continues by operating the actuator 90 by means of the controller 33. To operate the actuator 90, controller 33 may operate either one of the small stroke or large stroke actuator parts, and may do so by retrieving data from the memory 34 that defines the relation between the relative displacement between the first arm member 10 and the second arm member 11 and the rotation angle α of the position arm 8. After operating the actuator for inducing a displacement of a desired amount, the operator may return to step 84 wherein the sensor unit 26 is operated for determining the current Y position. After receiving the current Y position in step 86, the controller 33 again checks whether the received Y position is correct.

If in step 88 it is determined that the detected Y position in step 86 is indeed the desired Y position of the received new XY location of step 82, the method continues in step 92 wherein the current Y position may be stored in memory 34 (this step is optional). Then, the method is ended as indicated in 94 until e.g. a new XY location is received by the controller.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A positioning arm for positioning of a scan head of a scanning probe microscopy device relative to a surface, wherein the positioning arm comprises a base at a first end thereof for mounting the arm with the base to a static reference structure, wherein the positioning arm further comprises a first and a second arm member extending from the base, the second arm member extending parallel to the first arm member, wherein the positioning arm comprises a bridge member at a second end thereof, the bridge member connecting the first and the second arm members at said second end of the positioning arm, wherein each one of the first and the second arm members is respectively connected to each one of said base and said bridge member by means of a hingeable connection, and wherein the positioning arm further comprises an actuator acting on the first and second arm members to enable a relative displacement between the first and the second arm members in a longitudinal direction of said first and second arm members for swinging the second end of the positioning arm in a lateral direction that is transverse to the relative displacement, wherein the bridge member comprises a support for supporting the scan head.

2. The positioning arm according to claim 1, further comprising a controller cooperating with the actuator for controlling operation thereof for controlling the relative displacement between the first and the second arm members.

3. The positioning arm according to claim 2, wherein the controller is arranged for obtaining an amount of said relative displacement between the first and second arm members, and wherein the controller is arranged for calculating a transverse displacement of the bridge in a direction transverse to the positioning arm based on the amount of relative displacement.

4. The positioning arm according claim 2, further comprising a sensor unit for measuring the relative displacement between the first and the second arm members and for providing a sensor signal indicative of said relative displacement to the controller.

5. The positioning arm according to claim 4, wherein the sensor unit comprises at least one element of a group comprising an optical distance sensor, such as an interferometer, an electrical proximity sensor, such as a capacitive sensor or inductive sensor.

6. The positioning arm according to claim 1, wherein the actuator is arranged between the first arm member and the second arm member, and wherein the actuator comprises a first actuator part fixedly mounted to either one of the first or second arm member, and wherein the actuator comprises at least one second actuator part that is movable relative to the first actuator part by means of operation of the actuator in use, wherein the second actuator part acts upon said second arm member for inducing said relative displacement between the first and second arm members.

7. The positioning arm according to claim 6, wherein the actuator comprises a large stroke actuator element and a small stroke actuator element, wherein the large stroke actuator element comprises a spindle, wherein the spindle is comprised by the second actuator part and cooperates with the first actuator part to be movable relative thereto, and wherein the second actuator part further comprises a piezo type actuator mounted on a tip of said spindle and forming the small stroke actuator.

8. The positioning arm according to claim 1, wherein the actuator comprises one or more of: a large stroke actuator element for enabling large stroke longitudinal displacements between the first and second arm members, such as a spindle type actuator, or a small stroke actuator element for enabling small stroke longitudinal displacements between the first and second arm members, such as a piezo type actuator.

9. The positioning arm according to claim 1, wherein a spring member is mounted between the first and the second arm members for providing a return force between the first and second arm members directed towards an offset position of the second arm member relative to the first arm member.

10. The positioning arm according to claim 1, further comprising a cover enclosing at least a part of the actuator.

11. The positioning arm according to claim 10, wherein the cover comprises at least one element of a group comprising: a bellows, a flexible cover element, a sleeve, a cloth, or container element.

12. A method of positioning a scan head of a scanning probe microscopy device relative to a support surface,
wherein for performing said placing of the scan head use is made of a positioning arm comprising a base at a first end thereof wherein the base is mounted to a static reference structure, wherein the positioning arm further comprises a first and a second arm member extending from the base, the second arm member extending parallel to the first arm member, wherein the positioning arm comprises a bridge member at a second end thereof, the bridge member connecting the first and the second arm members at said second end of the positioning arm, wherein each one of the first and the second arm members is respectively connected to each one of said base and said bridge member by means of a hingeable connection, and
wherein the method further comprises a step of:
supporting the scan head from a support structure connected to the bridge of the positioning arm; and
moving the support structure by inducing, by means of an actuator comprised by the positioning arm and acting on the first and second arm members, a relative displacement between the first and the second arm members in a longitudinal direction of said first and second arm members, for swinging the second end of the positioning arm in a direction transverse to the relative displacement.

13. The method according to claim 12, further comprising the steps of:
controlling, by a controller cooperating with the actuator, operation of the actuator for controlling the relative displacement between the first and the second arm members;
wherein the step of controlling includes:
obtaining, by the controller, an amount of said relative displacement between the first and second arm members, and calculating by the controller a transverse displacement of the bridge in a direction transverse to the positioning arm based on the amount of relative displacement.

14. The method according to claim 13, further comprising:
measuring, using a sensor unit, the relative displacement between the first and the second arm members; and
providing a sensor signal, by the sensor unit to the controller, indicative of said relative displacement.

15. The method according to claim 12, further comprising providing a return force between the first and second arm members directed towards an offset position of the second arm member relative to the first arm member, wherein said return force is provided by means of a spring member mounted between the first and the second arm members.

* * * * *